Oct. 21, 1930.        P. E. WICKSTROM        1,779,201
AIR BLOWING APPARATUS
Filed July 5, 1927
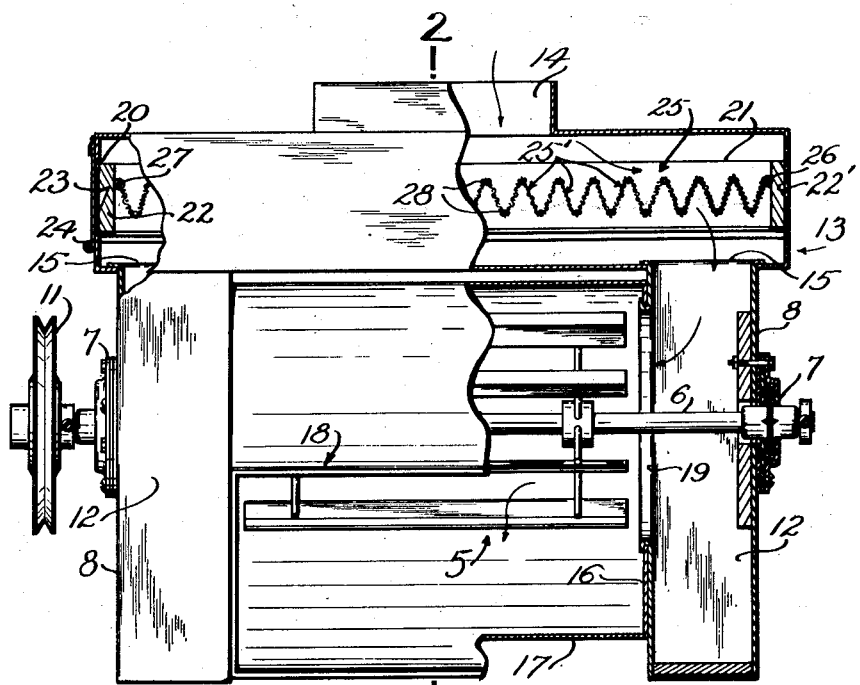
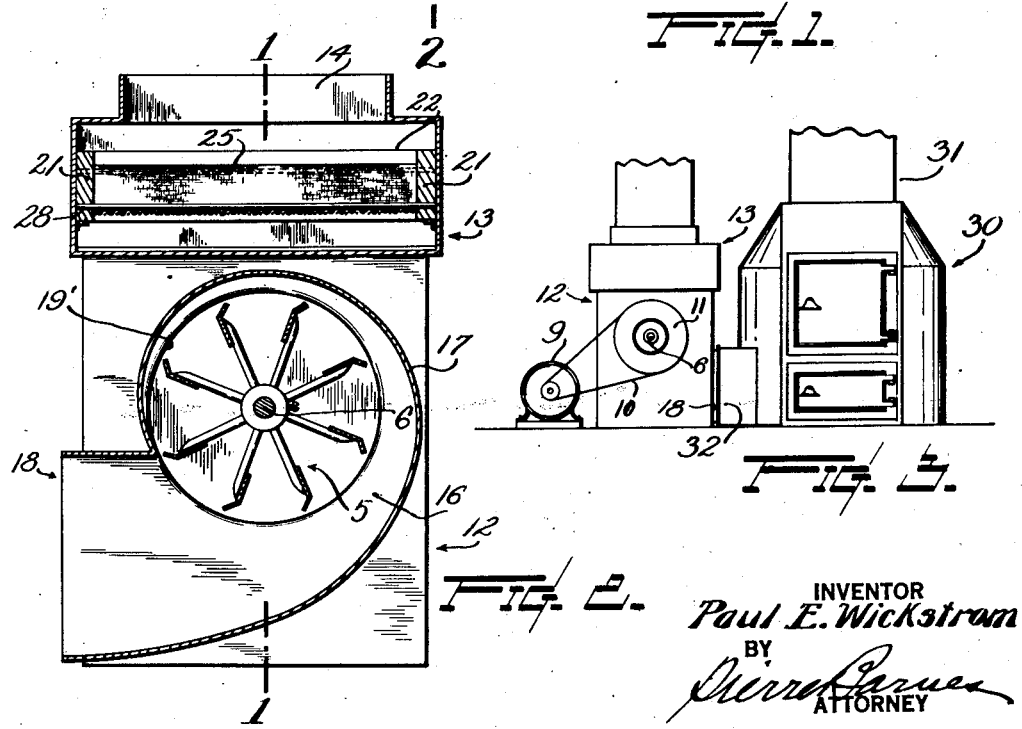
INVENTOR
Paul E. Wickstrom
BY
ATTORNEY Patented Oct. 21, 1930

1,779,201

UNITED STATES PATENT OFFICE

PAUL E. WICKSTROM, OF SEATTLE, WASHINGTON, ASSIGNOR OF ONE-HALF TO CHARLES C. BATESON, OF SEATTLE, WASHINGTON

AIR-BLOWING APPARATUS

Application filed July 5, 1927. Serial No. 203,491.

This invention relates to air-blower apparatus for use in air cleaning, heating and ventilating systems.

The object of the invention is the perfecting of apparatus of this character.

More specific objects and advantages of the invention will appear in the following description.

The invention consists in the novel construction, adaptation and combination of parts hereinafter described and claimed.

The invention is illustrated in the accompanying drawing, wherein,—

Figure 1 is a view, partly in front elevation, and partly in vertical section on the line 1—1 of Fig. 2; Fig. 2 is a transverse vertical section taken substantially on the line 2—2 of Fig. 1; and Fig. 3 is a view in side elevation, illustrating an application of the invention.

In the drawing, the reference numeral 5 indicates a centrifugal fan mounted upon a shaft 6. Said shaft 6 is journaled in bearing boxes 7 which are supported by end walls 8 of the frame. Said bearing boxes are of the noiseless type, preferably, forming the subject matter of an application for patent Serial No. 191,657, filed by me May 16, 1927.

The shaft 6 may be driven by any suitable known means, as, for example, an electric motor 9 (Fig. 3) through the medium of an endless belt 10 passing about a grooved pulley 11 mounted upon a protruding end of said shaft.

The frame above referred to is substantially the shape of an inverted capital U, constructed of metal plates, preferably, comprising hollow spaced apart side members 12, and an upper member 13 connecting the top ends of said side members. Said upper member 13 is provided with a central inlet opening 14 and, near each of its ends, with an outlet 15 communicating with the upper end of the duct provided within the respective side member.

The upper member 13 is of a rectangular box shape and constitutes what will be termed hereinafter as the receiving chamber, the inlet 14 therefore being located in its upper wall, and the outlets 15 in its lower wall. The spacing of the side members accommodate the fan and its casing therebetween.

This fan casing comprises side walls 16 and a peripheral wall 17 which is formed to a substantially spiral shape in transverse section to afford a progressively expanding space about the fan to the outlet connection 18.

The casing chamber, containing the fan, is provided with two circular inlets 19, $19^1$, one in each side wall of the fan casing, said inlets being positioned concentrically of the fan axis and communicating with the wing ducts provided by the side members 12 of the frame.

The receiving chamber 13, above referred to, has an opening 20 in one of its ends, for the admission and withdrawal of a rigid rectangular frame, or drawer, composed of sides 21 and ends 22, $22^1$. The drawer end 22 may be utilized to close the chamber opening 20, although I prefer to employ additionally thereto a door 23 which is hingedly connected at 24 to the chamber wall structure.

Said drawer, or slidable frame, serves as a removable holder for an air screening device for use between the air inlet and outlets of the receiving chamber. More particularly, said screening device consists of a piece 25 of foraminated material, preferably a strip of closely woven fabric, having a width equal to the spacing of the drawer sides 21 and of a length greater than the spacing of the drawer ends 22, $22^1$.

The ends of the screen strip 25 are provided with loops to receive transversely arranged rods 26 and 27, respectively, which rods engage in holes provided in the drawer sides 21.

Between said rods, said sides are provided with other holes within which engage the ends of rods 28 disposed in spaced relation lengthwise of the drawer, the alternate rods being arranged at different elevations; the strips $25^1$ being passed over and beneath the intermediate bars 28, alternately.

Such an arrangement of the rods and the screening strip as clearly shown in Fig. 1, affords a relatively large area of screen through which air is compelled to travel in passing through the receiving chamber. By such devices it is apparent that physical impurities—as dust or the like—are extracted by the screen from the air.

The screen is cleaned after removing the same from the drawer, when the latter is withdrawn from the receiving chamber.

The invention may be advantageously used for various purposes—as, for example, in cleaning and distributing air in ventilating systems, and in air cooling and heating systems.

I illustrate in Fig. 3 the application of the invention in an air heating system; wherein 30 represents a typical hot air heater having a hot air pipe 31 extending from the air heating chamber or radiator (not shown) within the heater, and an air inlet which, in this instance, is connected at 32 to the fan delivery duct of my invention.

Suction produced by the rotation of the fan draws air into the central portion of the fan from the ducts at opposite ends and expels the air centrifugally through the single outlet 18.

Air is supplied to the apparatus in a single stream into the receiving chamber, whence it is divided into two streams which flow through the above referred to ducts to the fan. Such dividing a single stream and restoring the same into a single stream is of importance to the efficiency of operation, and also obviates objectionable noises.

The air screening devices form an important part of the invention. The screen is arranged to present an extensive surface for the collection of dust, etc., which may be conveniently removed.

While I have illustrated an embodiment of the invention now preferred by me, I do not wish to be understood as confining myself thereto except as limited by the accompanying claims.

What I claim, is,—

1. In apparatus for filtering air in a ventilating system, the combination with a rotary fan, a casing therefor having air inlets in its opposite sides, and a delivery duct disposed substantially tangentially of the fan, of a hollow frame of substantially the shape of an inverted capital letter U to provide therein an air-receiving chamber and supporting legs therefor, said chamber being disposed above said casing and having outlets at its opposite ends communicating through the leg members of the frame with the respective casing inlets, said receiving chamber having an air inlet located at an elevation above that of its outlets, an air straining screen disposed in said receiving chamber between said chamber inlet and outlets, and a frame for said screen, said screen frame being slidably movable into and from operative position within the chamber for holding the screen in the current of air between the inlet and outlets of said chamber.

2. In a combination as defined in claim 1, wherein the screen frame is provided with an assembly of transversely arranged rods disposed in vertical and horizontal spaced relations with each other, said rod assembly serving as a rack for supporting the screen to afford a plurality of inclined air screening surfaces.

3. In apparatus for filtering air in a ventilating system, the combination with a screen, of a hollow frame of substantially the shape of an inverted capital letter U, a centrifugal fan, and a casing therefor located between and supported by the side members of said frame, said fan shaft being supported by journal boxes secured to said side members, the transverse member of the frame being provided with an air inlet to said screen, said transverse member and the side members of the frame constituting air ducts from said screen into the fan casing.

Signed at Seattle, Washington, this 15th day of June, 1927.

PAUL E. WICKSTROM.